United States Patent

[11] 3,575,652

| [72] | Inventor | James H. Snyder<br>Battle Creek, Mich. |
|------|----------|----------------------------------------|
| [21] | Appl. No. | 837,435 |
| [22] | Filed | June 30, 1969 |
| [45] | Patented | Apr. 20, 1971 |
| [73] | Assignee | Clark Equipment Company,<br>Buchanan, Mich. |

[54] MOTOR CONTROL CIRCUIT WITH SEMICONDUCTOR SWITCHING MEANS AND TRANSFORMER AND CAPACITOR BIASING MEANS
20 Claims, 4 Drawing Figs.

[52] U.S. Cl. ................................................. 318/341,
318/344, 318/345, 318/507, 318/510
[51] Int. Cl. ........................................................ H02p 5/16
[50] Field of Search........................................... 318/345,
347, 507, 510, 341, 344

[56] References Cited
UNITED STATES PATENTS
3,250,978  5/1966  Moscardi..................... 318/345

3,264,544  8/1966  Bowers.......................... 318/345X
3,419,778  12/1968  Gurwicz....................... 318/345X

*Primary Examiner*—Oris L. Rader
*Assistant Examiner*—H. Huberfeld
*Attorneys*—Kenneth C. Witt, John C. Wiessler, Robert H. Johnson and Reginald J. Falkowski

ABSTRACT: An electric motor is connected to a direct current electrical power source through a silicon controlled rectifier that is cyclically turned on by a triggering circuit and turned off by a commutating circuit. A semiconductor diode is connected in parallel with the silicon controlled rectifier in a reverse biased direction relative to the direct current source. The motor power circuit operates so that the diode is forward biased during part of the switching cycle by the action of a capacitor and transformer, and then, upon being reverse biased, momentarily carries part of the motor current in its reverse current direction thereby sharing the load current with the silicon controlled rectifier.

3,575,652

INVENTOR
JAMES H. SNYDER

BY R J Falkowski

ATTORNEY

MOTOR CONTROL CIRCUIT WITH SEMICONDUCTOR SWITCHING MEANS AND TRANSFORMER AND CAPACITOR BIASING MEANS

This invention relates to electrical power systems for controlling electric motors by cyclically connecting the source to the motor, particularly to electrical motor systems utilizing semiconductor switching devices to connect the source to the motor.

Until recently, direct current motors used in variable load applications were controlled by connecting a variable resistance in series with the motor and the power source. Motor power was controlled by varying the resistance thereby dissipating part of the electrical power in the resistance when operating at less than maximum power. In part to overcome this waste of power, systems have been devised that rapidly cyclically connect the power source to the motor. The proportion of on time to off time is selected to vary the effective power delivery to the motor. Because of the high rate of switching involved, electronic switching devices generally have been considered superior to mechanical switching devices in these applications. One disadvantage of semiconductor switching devices in motor applications of more than minimum power level requirements is that semiconductor costs increase greatly as current and switching speed requirements increase.

This invention is primarily directed to a power system that has a direct current motor powered by a direct current power source through a semiconductor switching device controlled by a pulse control circuit that cyclically turns the switching device, such as a silicon controlled rectifier, thyristor, or similar device, on and off to vary the effective electrical power delivered to the motor. A semiconductor diode is connected in the reverse biased direction in parallel with the silicon controlled rectifier and is cyclically forward biased. The diode shares the load current with the silicon controlled rectifier after its forward bias is renewed during the time required for the diode to recover and block current. The use of the diode makes the circuit more reliable and less expensive.

The objects and advantages of this invention will be apparent from the following detailed description:

Figure 1:
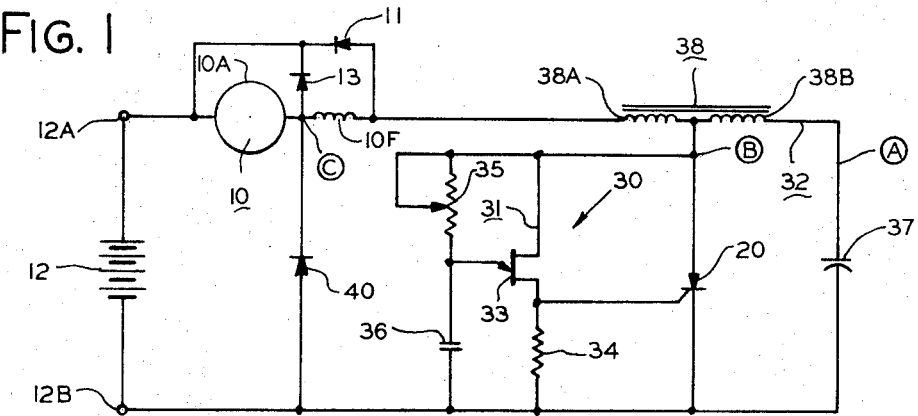
FIG. 1 is a simplified and basic schematic diagram of a motor and power source circuit embodying this invention.

Referring to FIG. 1, a means for converting electrical energy to mechanical energy, such as a motor 10, is connected to a power source, such as a direct current source 12 having a positive terminal 12A and a ground or negative terminal 12B, through an associated power circuit. The power circuit or system comprises a switching means having a semiconductor switching device 20, such as a silicon controlled rectifier or thyristor; a control means 30 for controlling the switching means to cyclically turn switching device 20 on and off; a semiconductor diode 40 or similar device connected in parallel with switching device 20; and a biasing means for cyclically forward biasing diode 40.

Motor 10, which may be of any type selected for a particular application, is a series wound direct current motor having a series connected armature winding 10A and a field winding 10F. A free wheeling diode 11 is connected across field winding 11 in a reverse biased direction relative to power source 12 to carry current induced in the field winding, and an armature diode 13 is connected across armature 10A to carry induced armature currents during portions of the cycle of operation of the motor.

Semiconductor switching device 20 of the switching means is connected in the power circuit between motor 10 and source 12 and is cyclically turned on and off by the cyclic application of a signal or positive pulse to its control terminal at a selectively controlled rate to cyclically connect the source to the motor to provide a selected average voltage to the motor in any manner known in the art.

Control means 30 comprises a means for turning switching device 20 on such as a triggering circuit 31 and a means for turning switching device 20 off such as a commutating circuit 32. The triggering circuit comprises a unijunction transistor 33, a load resistor 34, a rate control potentiometer 35, and a capacitor 36, and the commutating circuit comprises generally a capacitor 37 and a transformer 38 having a winding 38A and a winding 38B.

The biasing means cyclically and periodically forward biases diode 40 during portions of each of the cyclic periods of the turning on and off of switching device 20, and may have any configuration known in the art. In this embodiment, the biasing means comprises capacitor 37 and transformer 38 which, depending upon circuit conditions, provide a cyclic negative voltage to the cathode of semiconductor diode 40 for selected periods so that diode 40 conducts current in a forward direction for selected intervals during each switching cycle.

Figure 2:
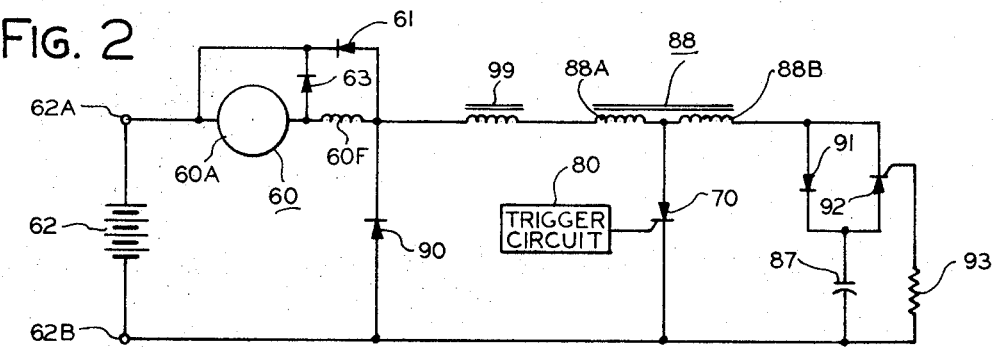
FIG. 2 is a simplified and basic schematic diagram of another motor and power source circuit embodying this invention.

Semiconductor diode 40 is connected in parallel with switching device 20 and in series with motor 10 and power source 12, and may have one side connected between the armature and field winding to thereby primarily carry part of the armature current as in the embodiment shown in FIG. 1 and may be connected to the other side of the field winding to thereby primarily carry part of both the armature and field current, as in the embodiment shown in FIG. 2. Referring to FIG. 1, semiconductor diode 40 is connected in the reverse biased direction relative to source 12, and normally blocks current between the motor and the electrical source in the direction of polarity connection of the source. However, the semiconductor diode does carry current when forward biased during part of a cycle and does carry armature current during the period of time that it takes the diode to recover its reverse biased blocking condition upon having a reverse biasing voltage applied to it in order to stop a current carrying forward biased condition. All semiconductor diodes exhibit this momentary current carrying capacity after being reverse biased before assuming a current blocking condition but semiconductor diodes vary in the speed at which the current blocking condition is assumed. The characteristic of the period of time required to assume a blocking condition, or reverse current blocking state, has been called the reverse recovery time and may be defined as the time it takes a diode to revert to a condition of high resistance when a potential of a reverse polarity direction is applied to it to change from a given forward biased current carrying condition. In most applications of semiconductor diodes a long reverse recovery time is considered undesirable. With this invention, the opposite is generally true and a longer reverse recovery time is preferred.

In the operation of the circuit shown in FIG. 1, direct current source 12 is connected across terminals 12A and 12B and is connected to motor 10 through switching device 20 and diode 40. A typical cyclic operation is shown by simplified curves A, B, and C in FIG. 3, which indicate voltages at corresponding points A, B and C, respectively, in FIG. 1 where point A is the positive plate of capacitor 37, point B the anode of switching device 20, and point C the cathode of diode 40. Assuming a cyclic operation as indicated by the curves in FIG. 3 and starting at time $a$ as indicated in FIG. 3, points A, B, and C are at the positive potential of source 12, capacitor 37 is fully charged, and no current is flowing through the motor from source 12.

To initiate a cycle, switching device 20 is cyclically turned on by triggering circuit 31 after a delay determined by the setting of potentiometer 35 which determines the time it takes capacitor 36 to charge to a sufficiently high level to turn on unijunction transistor 33. When unijunction transistor 33 is turned on, capacitor 36 discharges across resistor 34 and applies a positive pulse to the gate terminal of the silicon controlled rectifier, switching device 20. This is illustrated at time *b* in FIG. 3 by the potential decrease at point B to that of the ground terminal of the source plus the voltage across switching device 20.

The turning on of switching device 20 connects point B to terminal 12B and capacitor 37 begins discharging through winding 38B of transformer 38 as shown in curve 3A. Since windings 38A and 38B are wound to have their left terminals, as looking at the schematic, at the same polarity with comparable current directions, winding 38A has a negative potential induced at its left terminal by the current flowing through winding 38B. This negative potential appears at point C, and as shown in curve 3C at time *b*, point C becomes negative relative to terminal 12B.

Figure 3:
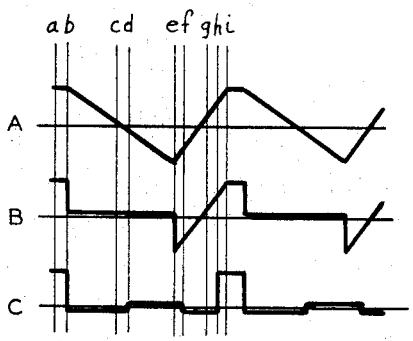
FIG. 3 shows simplified time-voltage wave forms that occur in the circuit shown in FIG. 1.

During the period of time that the discharging of capacitor 37 makes the left terminal of winding 38A negative, semiconductor diode 40 is forward biased and remains forward biased until the potential across capacitor 37 drops to a point, illustratively indicated as time *c* in FIG. 3, that the discharge current is insufficient to maintain the forward bias on diode 40 and diode 40 becomes effectively reverse biased. However, current continues through diode 40 from positive terminal 12A through armature winding 10A and diode 40 to terminal 12B for a period of time determined by the recovery time characteristic of diode 40. Upon completion of this period of time, illustrated as ending at time *d* in FIG. 3C, diode 40 blocks current. At this time point C assumes the small positive voltage of the voltage induced at the left side of winding 38A by the negative voltage swing of capacitor 37 plus the voltage drop across switching device 20.

Capacitor 37 continues discharging through winding 38B and switching device 20 until the voltage of capacitor 37 reaches its full negative potential, as shown at time *e* in FIG. 3A, after a period of time determined by the saturation of the square loop core of transformer 38. Capacitor 37 then begins discharging through winding 38B to reverse bias switching device 20, as the voltage of capacitor 37 appears across switching device 20, to commutate, or turn off, switching device 20. The voltage at point C remains positive, as shown in FIG. 3C following time 3, for the period of time, until time *f*, that it takes switching device 20 to assume a current blocking condition because of its reverse recovery time characteristic. With switching device 20 turned off, capacitor 37 charges to the positive potential of the source from positive terminal 12A through the motor armature and field windings, and through transformer 38.

After the recovery of the reverse blocking condition of switching device 20, time *f*, semiconductor diode 40 is forward biased because its cathode is effectively connected through saturated transformer 38 to negatively charged capacitor 37. After capacitor 37 has discharged to the level of little or no voltage across it and begins charging to a positive voltage, diode 40 is reverse biased, as illustrated at time *g*, but current continues in a reverse polarity direction until diode 40 recovers its current blocking condition, as shown at time *h*. When capacitor 37 is charging to a positive voltage after diode 40 has recovered its current blocking condition, the motor is effectively disconnected from the circuit of source 12 and motor inductance causes current to flow through diodes 11 and 13 during this time.

After the interval that it takes for capacitor 37 to become fully positively charged, shown completed at time *i*, capacitor 37 is ready for the next triggering of switching device 20. This, then is the condition at the beginning of the cycle and the cycle repeats itself at the selected rate determined by the setting of potentiometer 35.

In describing the operation of the circuit with the conditions generally illustrated by FIG. 3, it was assumed for illustrative purposes that the reverse recovery time of diode 40 was relatively fast and that current in the reverse direction through diode 40 stopped (at time *h*) before capacitor 37 was charged sufficiently to permit triggering of switching device 20 (at time *i*). However, if the period between times *g* and *h*, (in between times *c* and *d*), as shown in FIG. 3C, is extended, the reverse current blocking condition of diode 40 (time *h*) can occur after the full charging of capacitor 37 (time *i*). This situation is illustrated in FIG. 4 with curves 4A, 4B, and 4C comparable to curves 3A, 3B, and 3C, respectively.

Figure 4:
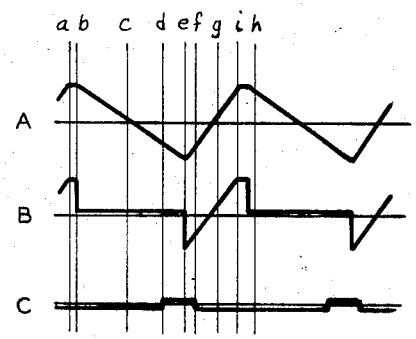
FIG. 4 shows curves similar to those shown in FIG. 3.

Referring to FIG. 4, the operation of the circuitry is the same as that described in relation to the conditions assumed in FIG. 3, that is, with time *b* occurring upon the firing of switching device 20 to start the discharging of capacitor 37, as shown in FIG. 4A, and to forward bias diode 40. At time *b* the operation of the circuitry is similar to that shown with respect to FIG. 3 and the circuitry goes through the same cycle of reverse biasing diode 40 at time *c* with reverse current flowing through diode 40 until time *d*, as shown in FIG. 4C, when diode 40 again blocks current. When the full negative voltage charge of capacitor 37 is reached at time *e*, switching device 20 is reverse biased and after the recovery of the blocking condition of switching device 20 at time *f*, diode 40 again becomes forward biased. The forward biased condition of diode 40 continues until the voltage of capacitor 37 is discharged to ground potential and diode 40 shortly thereafter becomes reverse biased as shown at time *g*. At this time the operation differs from that illustrated with FIG. 3 because the slower reverse recovery time of diode 40 results in diode 40 conducting reverse current for a longer period until time *h* which now occurs after time *i*, the time in the cycle at which switching device 20 may be triggered. Since the triggering of switching device 20 initiates the cycle, and since this can occur before the reverse blocking current recovery of diode 40, current continues from the source through the motor and diode 40 so that at time *b*, when the initiation of the next cycle occurs, the motor is again turned on to effectively provide 100 percent turn on time.

The capability of sharing of current by switching device 20 and diode 40 gives this circuitry and method of operation several advantages over the prior art. Not only does this circuit, with selected diode and circuit configurations, achieve 100 percent turn on time of the motor, but it also enables the current rating requirement of switching device 20 to be reduced to a level that can be handled by a relatively small and cheap switching device. This significantly reduces the cost of the circuit. Depending upon the configuration of the circuit used, the components, load, motors, the number of motors and other factors, this circuit can be designed to achieve these advantages in any installation. This includes alternating current installations where circuits of this type are used in back-to-back reverse poled parallel circuits.

FIG. 2 is a general schematic of another embodiment of this invention that may be used. An electrical source 62 has a positive terminal 62A and a ground terminal 62B that supplies current to a motor 60 of any known type having an armature winding 60A and a field winding 60F with a free wheeling diode 61 and an armature diode 63. The configuration of the circuitry is similar to that shown in FIG. 1 with a trigger circuit 80 connected to control a switching device such as a silicon controlled rectifier 70 and a semiconductor diode 90 connected in parallel with silicon controlled rectifier 70. A transformer 88 has windings 88A and 88B that operate in the same manner as transformer 38 in FIG. 1. A capacitor 87, similar to capacitor 37 in FIG. 1, provides a commutation source for rectifier 70 and a forward biasing source for diode 90.

This embodiment has an additional inductance winding 99 that is connected to substantially perform part of the function performed by field winding 10F in the circuit shown in FIG. 1. In addition, a diode 91, a silicon controlled rectifier 92, and a resistor 93 are connected to switch capacitor 87 into and out of the circuitry for positive control of the initiating of a cycle.

In the operation of this circuitry, after capacitor 87 has assumed its full negative charge, the right side of winding 88B becomes positive relative to its left side and the left side of winding 88A becomes negative relative to ground terminal 62B to forward bias diode 90. The forward biasing of diode 90 does not occur instantaneously, but is delayed by the inductance of winding 99. This forward biased condition exists generally for the interval shown as occurring between time $f$ and time $g$ in FIGS. 3 and 4.

The control circuitry for connecting capacitor 87 into the circuit operates when, upon initiation of a cycle by the delivery of a positive pulse to the gate of silicon controlled rectifier 70, the anode of silicon controlled rectifier 70 becomes negative and current flows through transformer 88 to induce a negative voltage at the right side of winding 88B. The transformer action of transformer 88 and the resulting polarity conditions cause current to flow through resistor 93 and make the gate terminal of controlled rectifier 92 positive relative to its cathode, thus turning on silicon controlled rectifier 92. This connects capacitor 87 to transformer 88 and current flows through transformer 88 in the same manner described with the circuit shown in FIG. 1. Current continues through silicon controlled rectifier 92 until it is turned off by a reverse biased condition, at which point diode 91 carries the current until diode 91 is reverse biased as capacitor 87 becomes fully positively charged and ready for the initiation of the next cycle.

While this specification contains a written description of the invention and the manner and process of making and using it and sets forth the best mode contemplated of carrying out my invention, there are many variations, combinations, alterations and modifications of the invention that can be made within the spirit of the invention.

I claim:

1. An electrical motor control system comprising:
   a direct current power source having a positive and a negative terminal,
   a saturable core transformer having two windings with a common terminal and so wound as to have induced voltages of opposite polarities at their ends opposite the terminal when there is a change in the electrical current flowing between these ends,
   a condenser connected between the end of one of said windings and the negative terminal of said power source,
   a direct current motor connected between the end of the other of said windings and the positive terminal of said power source,
   a switching device connected between the common terminal on said transformer and the negative terminal of said power source,
   a control means for cyclically turning said switching device on in response to the voltage at the common terminal of the transformer when said voltage is positive with respect to the negative terminal of said power source,
   means for turning said switching device off in response to the voltage at the common terminal of said transformer being negative with respect to the negative terminal of said power source,
   whereby said direct current motor is energized by unidirectional pulses of electrical current.

2. An electrical motor control system as claimed in claim 1 in which said saturable core transformer has a square hysteresis loop.

3. An electrical motor control system as claimed in claim 1 in which:
   said direct current motor is a series wound motor with its field winding in the circuit between the armature of said motor and the end of one of said transformer windings.

4. An electrical motor control system as claimed in claim 1 including:
   a semiconductor diode connected parallel with said switching device and in a reverse biased direction relative to said electrical source.

5. An electrical motor control system as claimed in claim 1 including:
   a semiconductor diode having a relative slow reverse recovery characteristic connected in series with said motor and said direct current power source and in reverse biased direction relative to said power source.

6. An electrical motor control system as claimed in claim 1 wherein:
   said switching device is a silicon controlled rectifier, having a control terminal, connected in series with the source and the motor in the forward biased direction relative to the source, and said control means comprises a trigger circuit adapted to selectively apply a pulse at a selected variable repetition rate to the control terminal to turn the silicon controlled rectifier on.

7. An electrical motor control system as claimed in claim 1 wherein:
   said switching device has a control terminal and said control means comprises a means for applying a signal at a selected cyclic rate to the control terminal to turn the switching device on.

8. An electrical motor control system as claimed in claim 2 in which:
   said switching device is a silicon controlled rectifier connected in series with the source and the motor in a forward biased direction relative to the source, and
   wherein said control means comprises an adjustable trigger circuit adapted to cyclically turn on the silicon controlled rectifier, and
   a commutating circuit adapted to cyclically turn off the silicon controlled rectifier.

9. An electrical motor control system as claimed in claim 2 in which:
   said switching device is a silicon controlled rectifier, having a control terminal, connected in series with the source and the motor in a forward biased direction relative to said source, and said control means comprising a trigger circuit adapted to selectively apply a pulse at selected variable repetition rate to the control terminal to turn the silicon controlled rectifier on.

10. An electrical motor control system as claimed in claim 2 in which:
    said switching device is a silicon controlled rectifier connected in series with the source and the motor in a forward biased direction relative to the source, and
    wherein said control means comprises an adjustable trigger circuit adapted to cyclically turn on the silicon controlled rectifier, and
    a commutating circuit adapted to cyclically turn off the silicon controlled rectifier.

11. An electrical motor control system as claimed in claim 4 wherein said motor has a series connected field winding and an armature winding,
    and said semiconductor diode has its cathode connected between the field winding and armature winding and is thereby connected in series with said motor armature winding and the source.

12. An electrical motor control system as claimed in claim 5 in which:
    said motor has a series connected field winding and armature winding, and said semiconductor diode has its cathode connected between the field winding and armature winding and is thereby connected in series with said motor armature winding and the source.

13 An electrical motor control system comprising:
   a direct current power source having a positive and a negative terminal,
   a saturable core transformer having two windings with a common terminal and so wound as to have induced voltages of opposite polarities at their ends opposite said terminal when there is a change in electrical current flowing between these ends,
   a condenser connected in series with the end of one of said winding and the negative terminal of said power source,
   a direct current motor including an armature connected in series between the end of the other of said windings and the positive terminal of said power source,
   an inductance connected between the armature of said motor and said end of the other of said windings, a semiconductor diode having its cathode connected between said armature and said inductance and said diode connected in series between said armature and said power source, a silicon controlled rectifier connected in parallel with said condenser with its anode connected to the common terminal on said transformer, control means for cyclically turning said silicon controlled rectifier on in response to the voltage at the common terminal of the transformer when said voltage is positive with respect to the cathode of said silicon controlled rectifier, means for turning said silicon controlled rectifier off in response to the voltage at the common terminal of said transformer being negative with respect to the cathode of said silicon controlled rectifier, whereby said direct current motor is energized by unidirectional pulses of electrical current.

14. An electrical motor control system as claimed in claim 13 in which said saturable core transformer has a square hysteresis loop.

15. An electrical motor control system as claimed in claim 13 including:

a semiconductor diode having a relatively slow reverse recovery characteristic connected in series with said motor and said direct current power source and in reverse bias direction relative to said power source.

16. An electrical motor control system as claimed in claim 13 in which:

said saturable core transformer has a square hysteresis loop, and including:

a semiconductor diode having a relatively slow reverse recovery characteristic connected in series with said motor and said direct current power source and in reverse bias direction relative to said power source.

17. An electrical motor control system as claimed in claim 13 in which:

said control means comprises an adjustable trigger circuit adapted to cyclically turn on the silicon controlled rectifier, and said means for turning said switching device off is a commutating circuit including one winding of said transformer and said condenser.

18. An electrical motor control system as claimed in claim 16 in which:

said control means comprises an adjustable trigger circuit adapted to cyclically turn on the silicon controlled rectifier.

19. An electrical motor control system as claimed in claim 18 in which:

said adjustable trigger circuit includes an adjustable resistor and a condenser in series with each other and in parallel with said silicon controlled rectifier.

20. An electrical motor control system as claimed in claim 19 in which:

said adjustable trigger circuit includes a unijunction transistor.